No. 888,536. PATENTED MAY 26, 1908.
J. W. RUSSELL.
COUPLING DEVICE FOR SNOW PLOWS.
APPLICATION FILED AUG. 26, 1905.

2 SHEETS—SHEET 1.

Attest;
J. H. Ware
Grace Knight

Inventor,
James W. Russell, by
A. V. B. Upham,
his Attorney.

No. 888,536.
PATENTED MAY 26, 1908.
J. W. RUSSELL.
COUPLING DEVICE FOR SNOW PLOWS.
APPLICATION FILED AUG. 26, 1905.
2 SHEETS—SHEET 2.
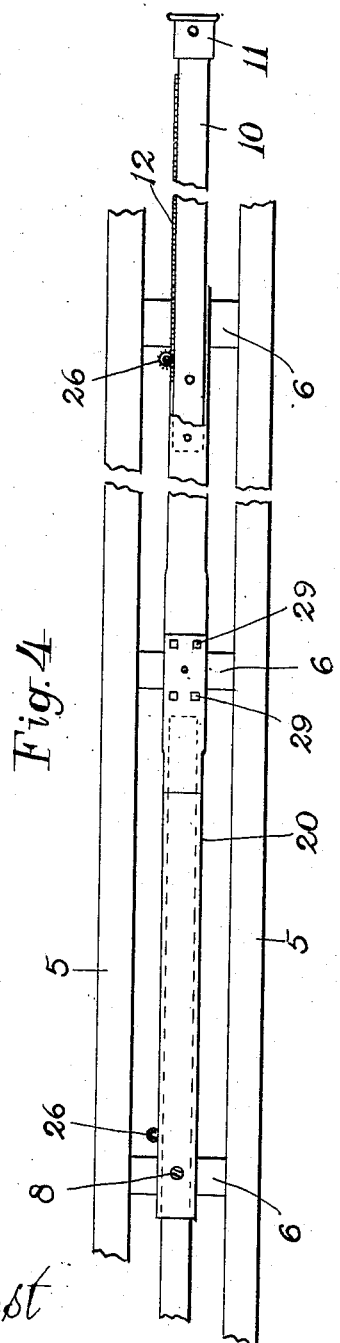
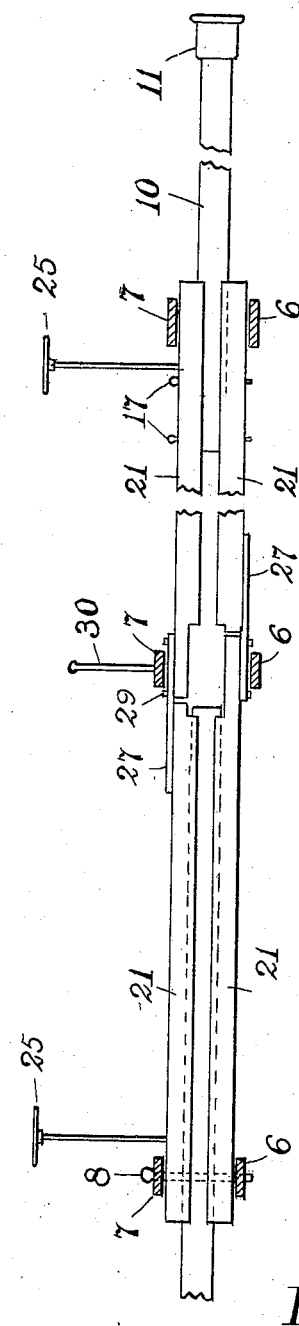
Attest
J. H. Ware
Grace Knight
Inventor,
James W. Russell,
By A. B. Upham,
His Attorney.

UNITED STATES PATENT OFFICE.

JAMES W. RUSSELL, OF BOSTON, MASSACHUSETTS.

COUPLING DEVICE FOR SNOW-PLOWS.

No. 888,536.  Specification of Letters Patent.  Patented May 26, 1908.

Application filed August 26, 1905. Serial No. 275,875.

*To all whom it may concern:*

Be it known that I, JAMES W. RUSSELL, a citizen of the United States, and a resident of Boston, in the county of Suffolk, Commonwealth of Massachusetts, have made certain new and useful Improvements in Coupling Devices for Snow-Plows, of which the following is a full, clear, and exact description.

This invention relates to double-end snow-plows, and has for its object the construction of a coupling device therefor capable of, first, being used at either end and to leave the opposite end of the plow free and clear for its work; second, being used at both ends of the plow simultaneously in order to be coupled into a train for transportation purposes, and, lastly, being capable of being wholly withdrawn within the plow at both ends of the latter in order to better shut out rain and dust during the months when not in use.

Figure 1:
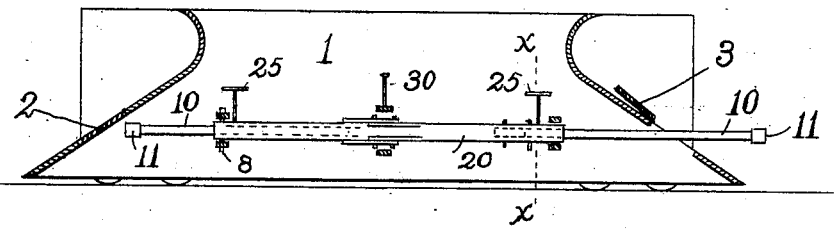
Figure 2:
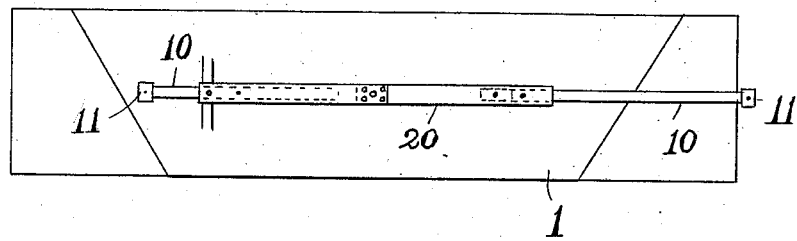
Figure 3:
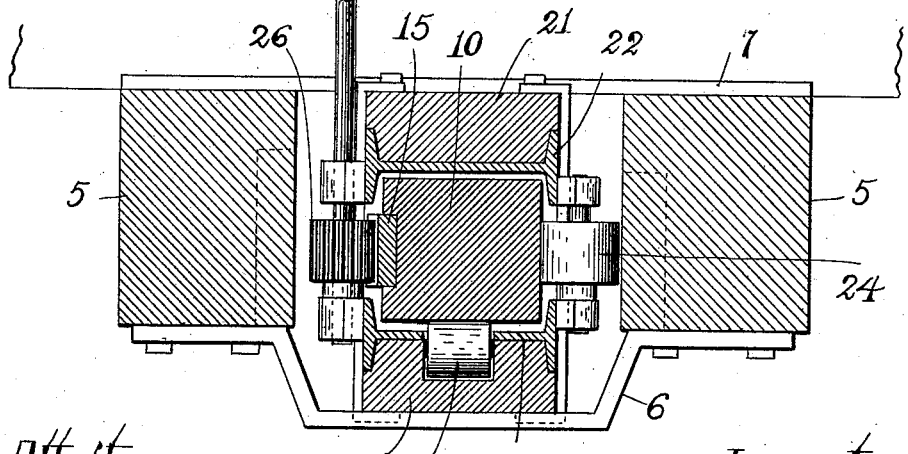

Referring to the drawings forming part of this specification, Figure 1 is a diagram of a double-end snow-plow in side elevation showing my coupling device with one end in position for attachment to a propelling engine, and with its opposite end withdrawn within the plow. Fig. 2 is a similar view, but in plan. Fig. 3 is a detail cross section of the coupling-bar at the line X X in Fig. 1, showing the adjusting device by means of which either end of the coupling-bar is moved in and out. Fig. 4 is a plan view of the coupling device, parts thereof being broken away. Fig. 5 is a side view of the same.

The type of snow-plow to which my invention is applied is the double-end plow set forth in my U. S. Patent No. 717,283; but it is also adapted for other types of rolling stock, and especially for end-dump cars. The double-end snow-plow 1 is shown with its coupling-bar door 2 at one end closed, thereby protecting the coupling-bar which has been drawn back within the plow; while the other door 3 is represented as wide open to permit the extension of the coupling device at the opposite end of the plow.

The coupling-bar proper 20 is centrally located within the snow-plow, and is preferably composed of two separated parts 21, between which are slidably held the coupling-extensions 10, each having a suitable form of coupler at its outer extremity, as the old style of coupler-head 11 shown for ease in illustration.

The duplex coupling bar 20 is designed to be held against longitudinal displacement, but is permitted suitable lateral play between the car-sills 5 and the yokes 6 and 7 bolted to said sills. The means for sliding the coupler-extensions 10 in and out of the snow-plow consist of rack-bars 12 (Figs. 3 and 4) fixed to one lateral face of each said extension, and a pinion 26 meshing with each said rack-bar and operated by a hand-wheel 25.

When it is wished to use this snow-plow for its intended purpose, one of the coupler-extensions is retracted within the plow, by turning said hand-wheel, and the other coupler-extension moved outwardly by means of its hand-wheel. This latter coupler-extension is then locked in position relative to the coupling-bar by passing two or more pins 17 (Fig. 5) down through both thereof. Then a single strong pin 8 is introducde through the yokes 7, 6, coupling bar and coupler-extension at the other end of said bar, as shown in the drawings; thereby both securing the latter coupler-extension within the snow-plow and providing the operative pivot for the coupling device.

As set forth in my U. S. Patent No. 470,951, the best method of coupling a snow-plow is to have an elongated coupling-bar pivoted near the front end of the plow and laterally movable at its rear end. Hence my present coupling pivot is located close to the operating end of the snow-plow whichever direction it travels. To reverse the direction of operation of this snow-plow, the pins 17 and 8 are withdrawn; one coupler-extension drawn in and the other forced out, and said pins introduced as before but at opposite locations.

To enable the snow-plow to be coupled into a train of cars, and hence coupled at each end, the coupling-bar 20 is jointed at its center as shown in Figs. 4 and 5, and a coupling-pin 30 introduced through the yokes 6 and 7 above and below said joint; the bolts 29 being removed which normally holds the coupling-bar as one inflexible whole. As shown in said figures, the said joint is formed by means of the heavy plates 27 fixed to one member of each half and overlapping the other; and by means of said pin 30 penetrating said members and plates. With said pin 30 in place and the bolts 29 removed, each coupler-extension and its half of the coupling-bar can swing freely on the central pivot pin 30 and so the snow-plow be made capable of coupling within a train of cars. This is a very important feature and reduces the possible delay and expense considerably when a plow is to be shipped to a distant point, as compared to a snow-plow capable of coupling at but one end at a time.

I prefer to have the coupling-bar 20 formed with wooden timbers 21 having the metal I-beams 22 fixed to the inner faces, as shown in Fig. 3; the parts being rigidly connected by means of heavy iron straps. The flanges of these I-beams serve both to hold the timbers in rigid union therewith, and also to provide an inclosed space for the reception of the coupler-extensions 10.

To retain the rack-bars 15 in mesh with the pinions 26, one or more friction-rolls 24 are provided, supported by the coupling-bar. I also provide a sufficient number of friction-rolls 23 carried by the lower timber 21, for the purpose of supporting the coupler-extensions out of contact with the under I-beam 22.

As it is unnecessary to have the sills 5 as deep as the combined coupler-bar and extensions, the lower yokes 6 are centrally depressed as shown in Fig. 3; and to provide ample clearance for the pinions 26 and friction-rolls 24 in the lateral movements of the coupling-bar and coupler-extensions, the sills 5 are cut out as indicated by dotted lines in Fig. 3 at points where said parts would otherwise strike.

What I claim as my invention and for which I desire Letters Patent is as follows, to wit:

1. The combination with a double-ended piece of rolling-stock, of a centrally located coupling-bar, and a coupler-extension at each end of said bar; each extension being held telescopically slidable by said bar but laterally inflexible; and means for adjusting said extensions longitudinally.

2. The combination with a double-ended piece of rolling-stock, of a centrally located coupling-bar jointed at its mid-length, means for rendering said bar inflexible at will, coupler-extensions at the ends of said bar, each being held telescopically slidable by said bar but laterally inflexible, means for adjusting said extensions longitudinally, and means for pivoting said bar at either of a plurality of points to the rolling-stock.

3. The combination with a double-ended piece of rolling-stock, of a coupling-bar therefor provided with longitudinally movable coupler-extensions at its ends, a rack-bar fixed to each coupler-extension, pinions carried by said coupling-bar meshing with said rack-bars, and means for forcibly turning said pinions.

4. The combination with a double-ended piece of rolling-stock, of a coupling-bar therefor provided with coupler-extensions at its ends capable of independent longitudinal adjustment, and a pin disposed to be passed through said bar and the coupler-extension which is retracted therein, and also through a suitable anchorage in said rolling-stock; whereby the opposite coupler-extension being put into use, the latter and the coupling-bar are permitted a lateral swing on said pin as a pivot.

5. The combination with a double-ended piece of rolling-stock, of a centrally jointed but normally rigid coupling-bar, coupler-extensions independently longitudinally movable at the ends of said coupling-bar, means for locking said extensions relative to said coupling-bar, and a coupling-pin designed to be inserted through a suitable anchorage in said rolling-stock and through said jointed part of said coupling-bar when the devices are removed by which said bar is rendered normally rigid; whereby either or both of said coupler-extensions can be used simultaneously.

6. The combination with a double-ended piece of rolling-stock, of a coupling-bar composed of two parallel separate parts rigidly connected, coupler-extensions located within the same and adapted for independent longitudinal adjustment therein, means for locking either or both said extensions in their extended positions, and means for pivotally anchoring either end or the center of said coupling-bar.

7. The double-ended coupling device composed of parallel separated parts rigidly united, a coupler-extension slidable within said parts, a rack-bar secured to an exposed face of said coupler-extension, friction-rolls supported by said parallel parts in contact with the opposite face of said coupler-extension, a pinion meshing with said rack-bar and having bearings supported by said parallel parts, and means for forcibly turning said pinion.

8. The combination of a coupling-bar consisting of two separated parallel wooden timbers rigidly connected, metal I-beams fixed to the inner faces of said timbers, and a longitudinally movable coupler-extension between said I-beams.

9. The combination with a piece of rolling-stock, of separated longitudinal sills, centrally depressed yokes extending from one sill to the other, a coupling-bar laterally movable between said sills and upon said yokes, and a longitudinally movable coupler-extension carried by said bar.

10. A draft rigging having a drawbar-holding member, a drawbar shank supported by and shiftable upon the drawbar-holding member, and means to interlock said members to hold the drawbar shank in different adjusted positions.

11. A draft rigging having an automatic coupler which is shiftable thereon, and means for adjustably interlocking the coupler with the rigging to vary the projection of the coupler at the end of the car.

12. A draft rigging having an endwise adjustable draw bar, locking means therefor, and a controller for the locking means.

13. A draft rigging having a drawbar-holding member, a drawbar shank supported thereby and means to hold the shank in different adjusted positions.

In testimony that I claim the foregoing invention, I have hereunto set my hand this 19th day of August, 1905.

JAMES W. RUSSELL.

Witnesses:
  FRED G. TILTON,
  A. B. UPHAM.